Oct. 9, 1951 W. D. MURRAY 2,570,369
HUMIDIFIER FOR INTERNAL-COMBUSTION ENGINES
Filed Aug. 1, 1949
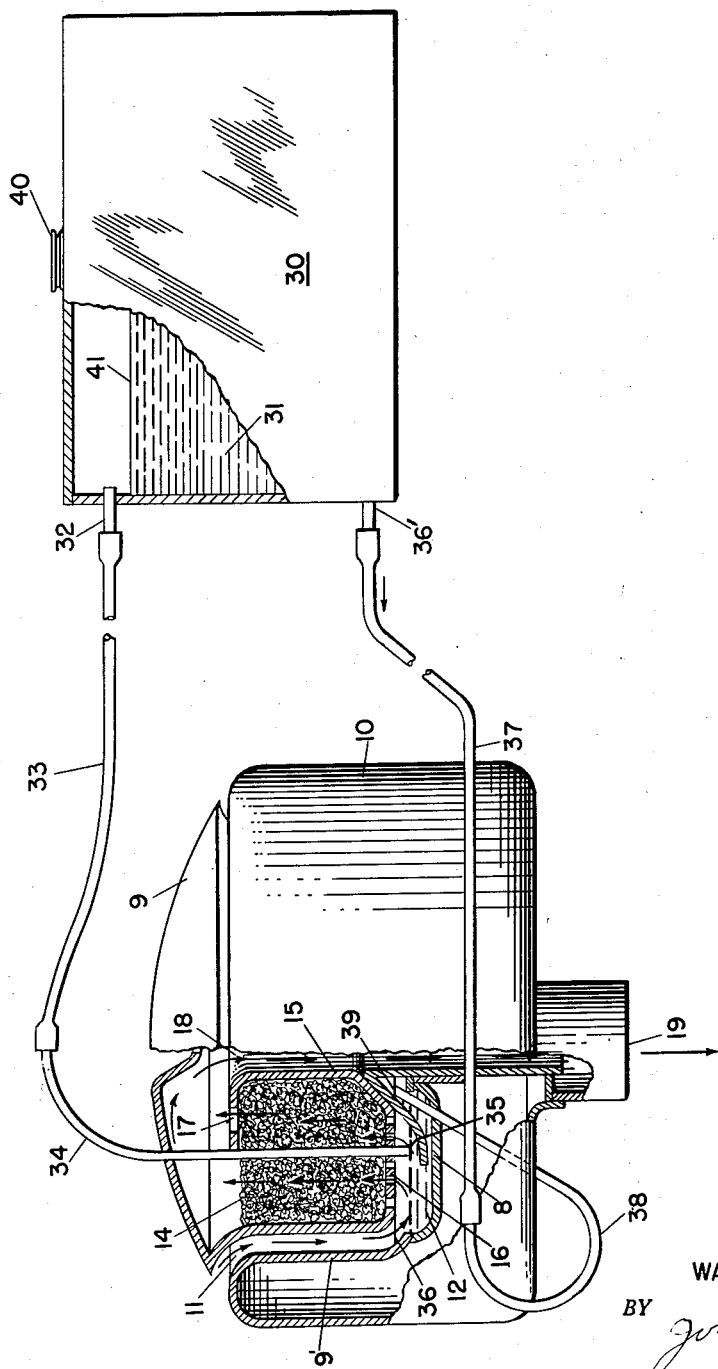
INVENTOR.
WALTON D. MURRAY
BY Joseph Rossman
ATTORNEY Patented Oct. 9, 1951

2,570,369

UNITED STATES PATENT OFFICE 2,570,369

HUMIDIFIER FOR INTERNAL-COMBUSTION ENGINES

Walton D. Murray, Marinette, Wis.

Application August 1, 1949, Serial No. 107,943

1 Claim. (Cl. 261—119).

This invention relates to a humidifier for internal combustion engines and has for its object the introduction of water vapor into the cylinders of an internal combustion engine such as a motor car engine.

According to the present invention a device is provided for generating water vapor and conducting same to the carburetor of an internal combustion engine, where said vapor will unite with the gas generated within the carburetor, thereby creating an explosive mixture which will effect a considerable saving in gasoline or other fuel employed in the engine and will also increase the power of said engine as well as eliminate carbon trouble and "pinging" noise of the engine.

It is a further object of the invention to pass the air intake for an internal combustion engine through a water bath maintained at a constant level before passing the air through a suitable air filter used in conjunction with motor car engines.

It is a further object of the invention to deliver properly humidified air into the intake manifold of an internal combustion engine without introducing an excess amount of moisture and to provide means for automatically maintaining an adequate supply of water for this purpose by a device which is simple in construction and easy to install.

Further objects and advantages of the invention will be apparent from the following description and appended drawing which represents an elevational view of the humidifier, partly in section, to show its construction and operation.

The humidifier comprises essentially an air cleaner construction having a pan or receptacle for maintaining a bath of water therein at a substantially constant level, a tank holding a supply of water connected to the pan, an air tube connected at the top of the water tank and having its end immersed in the water bath so as to seal same and adapted to permit air to enter the air tube when the water level in the pan drops below the end of the air tube whereby water will flow from the water tank until the level rises sufficiently to seal the end of the water tube. The flow of water from the tank will then cease automatically. The humidified air is then passed through an air filter and thence to the carburetor where it is admixed with the vaporized fuel.

Further details of the invention will be apparent from the drawing wherein the numeral 10 represents the outer casing of one example of my humidifier adapted for use in conjunction with automobile engines. The casing 10 is provided with a suitable cover 9 closing an inner air filter chamber 15. The chamber is filled with suitable shredded or comminuted filtering material 14. The bottom wall 16 of the filter chamber is provided with a plurality of perforations to permit suitably humidified air to enter therethrough and pass upwardly through the filter material 14 as shown by the arrows in the drawing and then out through the top of the filter chamber through openings 17 into the space above the filter chamber. The air then passes downwardly through the central port 18 and out through the orifice 19 connected to a carburetor (not shown).

A suitable water pan or receptacle 8 is provided beneath the lower wall 16 of the filter chamber 15 to receive and automatically maintain a bath 12 of water therein at a constant predetermined level 36 by means which will be described hereinafter. The pan 8 may be made integral or suitably affixed to the reentrant wall portion 9' of the casing which provides an air intake passage 11. A supply of water 31 is maintained in a suitable water tank 30, of say about 1 gallon capacity, which can be refilled at desired intervals to the level 41 by removing cap 40. An air outlet 32 is provided at the upper portion of the water tank 30 which is connected by means of rubber tubing 33 to air inlet copper tubing 34 which extends through the cover 9 of the air filter and has its end 35 extend through the bottom wall 16 of the filter chamber 15. A copper water outlet 36' is provided adjacent the bottom of the tank 30 which is connected by a flexible rubber tubing 37 to a copper tubing 38. The tubing 38 extends through the bottom of the casing 10 and through the water pan 8. The open end 39 of the tube 38 is positioned at a suitable height above the bottom of the water pan 8 which will determine the level 36 of the water to be maintained in the pan.

In operation, air enters through the intake passage 11 of the humidifier and then passes over the water bath 12 whereby the air is humidified and saturated with water vapor. The humidified air then enters through the openings in the bottom wall 16 and passes upwardly through the filter material 14 and then downwardly through the central port 18 and orifice 19. Any excess of moisture which may be carried by the air in the form of droplets or liquid will be separated by the mass of filter material and will percolate back to the water bath through openings in the bottom wall of the filter chamber. When the level 36 of the water in the pan drops, air will enter the open end 35 of the tube 34 and thereby break the vacuum at the top of the tank 30. Water will then flow through tube 36', pipe 37 and tube 38 until the level of the water rises sufficiently to seal the end 35 of the tube 34 thereby automatically stopping the flow of water from the tank 30.

The present invention thus provides a very simple and relatively inexpensive device for humidifying the air supplied to internal combustion engines which is easy to install and operates automatically without requiring any attention except that the water tank has to be refilled from time to time. The water consumption of the humidifier varies with the humidity of the atmosphere. If the humidity of the atmosphere is high, the less water the humidifier uses, but when the humidity of the atmosphere is low the humidifier requires more water.

It will thus be evident that the present invention greatly increases the efficiency of operation of present-day internal combustion engines and greatly economizes fuel consumption.

I claim:

A humidifier for internal combustion engines comprising a sealed water supply tank, an air cleaner including a pan for maintaining a bath of water therein at a predetermined level, a tube connecting the bottom of said water tank to said pan for supplying water thereto, said air cleaner having an inlet for passing air over said water bath to humidify the air, an air tube connected to said tank adjacent the top thereof, the end of said air tube extending into the cleaner and normally sealed by the water in said pan and adapted to permit air to enter therein when the water level in said pan drops below the end of said air tube whereby water will flow from said tank until the end of said air tube is sealed, and an air filter positioned above said water pan whereby the air to be humidified passes over the water bath and through the filter and thence to the carburetor.

WALTON D. MURRAY.

REFERENCES CITED

The following references are of record in the file of this patent:

UNITED STATES PATENTS

| Number | Name | Date |
|---|---|---|
| 492,296 | Jeffery | Feb. 21, 1893 |
| 1,414,993 | Milburn | May 2, 1922 |
| 1,497,367 | Frese | June 10, 1924 |
| 1,575,292 | Tyler | Mar. 2, 1926 |
| 2,040,376 | Hallerberg | May 12, 1936 |
| 2,435,798 | Rice et al. | Feb. 10, 1948 |
| 2,537,495 | Wallin | Jan. 9, 1951 |